April 23, 1935.                C. VON VARENDORFF                 1,998,796
                            MOUNTING FOR GLASS PANELS
                               Filed May 29, 1931

Inventor:
Curt von Varendorff
By
Harold D. Penney, Atty.

Patented Apr. 23, 1935

1,998,796

UNITED STATES PATENT OFFICE 1,998,796

MOUNTING FOR GLASS PANELS

Curt von Varendorff, Stettin, Germany

Application May 29, 1931, Serial No. 540,938
In Germany June 2, 1930

5 Claims. (Cl. 296—84)

In the greater part of all accidents occurring with motor cars the occupants are hurt by the splintering front-screen. Also in the case that at collision or at the running of the car into an obstacle the glass is not directly struck, the said pane cracks or splinters for the reason that the destructive forces act on the metal frame in which the pane is mounted. Moreover the front-screen is often demolished in the case that at a sudden stop of the car occupants sitting directly in rear of the pane strike with their heads against said pane, whereby said occupants are hurt by the splinters of the pane. It also happens that the pane is demolished by hens or other birds flying against the pane.

The means proposed heretofore for avoiding all these damages and dangers are not satisfactory. Also the so-called splinterless glass does not redress the said drawbacks, as this glass offers so much resistance to the heads of the occupants striking against it that fractures of the skull already occurred. A plain embedding of the pane into narrow rubber folds fully inserted into the metal frame cannot help, because the connection of the pane with the metal frame would in this way be a much too rigid one.

The principal object of my invention is the avoidance of the mentioned drawbacks and the provision of a mounting for panes of glass, especially for front-screens and windows of motor cars, aeroplanes, airships, railway-carriages etc. which mounting will prevent the breakage of a glass pane in consequence of blows acting immediately or through the intermediary of the rigid frame on said glass pane and also in consequence of any twisting of the rigid frame, and which mounting will further prevent a too firm connection of the glass pane with the rigid frame and correspondingly prevent in accidents a breakage of the glass pane into long and dangerous splinters which stick fast in the rigid frame and are not easily to be removed.

A further object of my invention consists in a mounting allowing the use of relatively thin glass-panes which are cheaper than other panes and do not necessarily give rise to severe injuries in accidents.

A further object of my invention consists in a mounting for glass panes which is simple and cheap in manufacture and which allows a quick and convenient mounting of the pane.

A further object of my invention consists in a mounting for glass panes which allows the pane to sever from the mounting at the occurrence of forces being directed towards the outside. In the case of panes of the so-called splinterless glass which may thus be squeezed out of the mounting injuries of the occupants of the car are avoided which might otherwise occur through the impact against the pane which according to my invention can also intentionally be squeezed from the inside out of the mounting without an injury of the operator.

These objects and further objects which will become apparent from the following specification are founded substantially on an arrangement in which the glass pane is held in the rigid frame in connection with the respective motor car by means being resilient at least towards the outside of the motor car, so that the pane may give way under a pressure acting on it from the inside of the car and may correspondingly fall out of its mounting. For this purpose the glass pane is preferably held in an intervening frame made of soft rubber or a similar elastic material and consisting of one or several parts, which intervening frame is fastened to the said rigid frame, whereby the exterior one of the two flanges of the intervening frame embracing the glass pane steps back against the respective inner flange of the rigid frame, whereas the exterior flange of the rigid frame steps back against the marginal edge of the glass pane. Other features of my invention are set forth in the following specification and placed under protection in the following claims.

In the drawing

Fig. 3 is an enlarged section through the upper part of the frame according to the line III—III of Fig. 1, whereas

Figure 1:
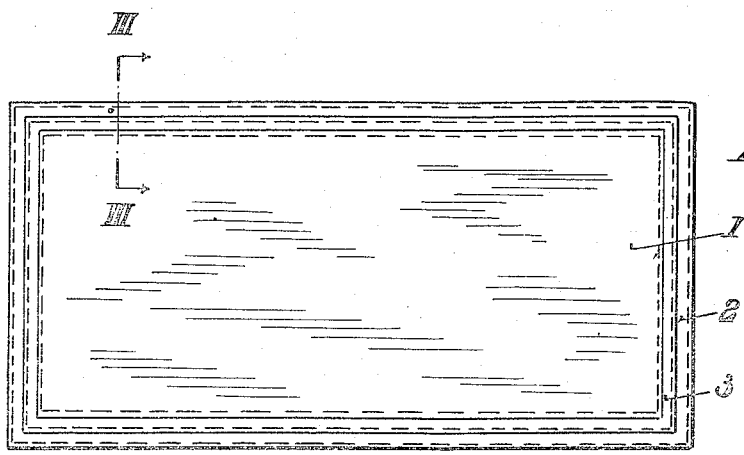
Fig. 1 is a front elevation of a front-screen of a motor car mounted according to my invention, whereby the frame holding the pane is completely assembled.
Figure 2:
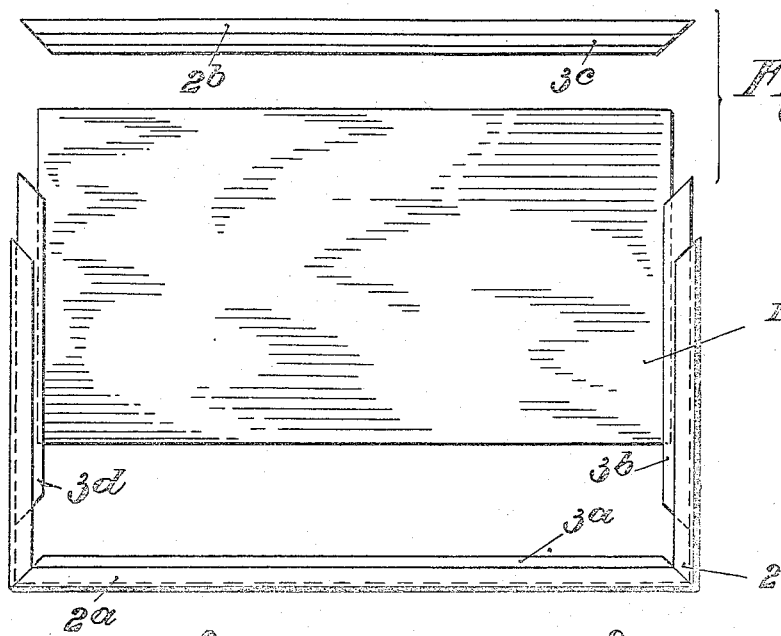
Fig. 2 shows in a similar view the front-screen and the parts of the frame in a partly assembled state.

According to the embodiment illustrated in the drawing the glass pane 1 is directly held in an intervening frame 3 which is made of soft rubber and held in a metal frame 2 arranged in the usual way in the respective motor car. As shown in Fig. 2 the intervening frame 3 consists of four parts 3a, 3b, 3c, 3d which correspond with the four sides of a rectangle. The ends of the several parts of the frame are cut in such a way that the edges are oblique in correspondence with the diagonal lines of the respective rectangle, and that the edges of adjacent parts fit closely together. The cross-section is shown in the Figs. 3 and 4. In both embodiments the parts of the intervening frame 3 have on their sides turned to the glass pane 1 grooves 5 which are formed between marginal ledges 6 and 7. The front ledge 7 steps back against the rear ledge 6. In the case of window-panes for aeroplanes, airships, railway-carriages etc. the ledge 7 on the outside is the more narrow one.

The rubber strips 3a, 3b, 3c and 3d forming the intervening frame are inserted into the exterior rigid frame 2 in the way shown in Fig. 2. The exterior frame is composed of two parts 2a, 2b the first of which parts has in the illustrated embodiment the shape of an open bent piece the closed side of which is formed by the part 2b of the frame. The interior marginal sides form grooves as shown in the cross-sections according to Figs. 3 and 4. 2c, 2d are the ledges which form the groove and the front ledge 2c of said ledges is also in this case more narrow than the rear ledge 2d and to such an extent that the said front ledge 2c steps back against the bottom 4 of the groove 5 of the intervening frame 3.

After the insertion of the parts 3a, 3b and 3d of the intervening frame into the rigid exterior frame 2 the glass pane 1 is slipped from top into the grooves 5 of the intervening frame in the way shown in Fig. 2. Then the rubber strip 3c which has previously been inserted into the part 2b of the frame is slipped over the free upper edge of the glass pane, whereupon the ledge 2b of the frame is screwed to or connected in another way rigidly with the free side-piece of the part 2a of the rigid frame. The front-screen is then ready for being put up.

Figure 3:
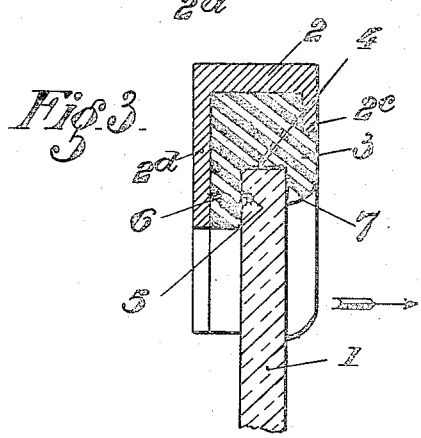

As on the front side indicated by the arrow in Fig. 3 the glass pane is not overlapped by the flange 2c of the metallic frame 2, and also the glass pane is at its marginal edge overlapped only to a little extent by the front flange 7 of the intervening frame 3 the pane will give way towards the front under a certain pressure exerted in the direction of the route, and such pressure must not be very high, whereas the said pane offers resistance to pressures exerted in the opposite direction and especially to the wind-pressure acting on the front-screen. If therefore during a sudden and hard application of the brakes or at collision the driver strikes with his head against the glass pane, he will not be injured neither through the impact nor through splinters of the demolished pane as it would be the case, when the usual mountings are employed. By the impact the glass pane is squeezed out of its mounting towards the front and falls down without injuring the driver. On account of the elastic padding of the glass pane relatively to the frame 2 also through jerks acting on the frame 2 in the direction of the plane of the glass pane 1 and through twistings of the said frame the glass pane will not be easily demolished as it is the case in the usual mountings.

Figure 4:
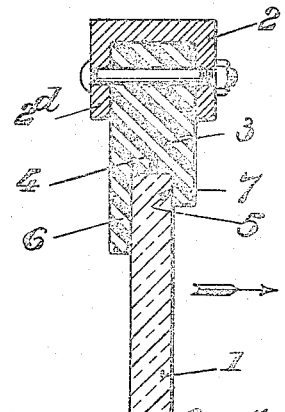
Fig. 4 is a similar view of a modification of the frame.

The embodiment shown in Fig. 4 is distinguished from the mounting shown in Fig. 3 especially by the feature that the glass pane is held in rear only by the rear flange 6 of the intervening frame 3 and that the rear flange 2d of the rigid frame 2 does not overlap the glass pane 1.

For the good operation of the new mounting it is essential that the intervening frame 3 consists of a resilient material, and that the front flange or exterior flange 2c of the rigid frame holding the intervening frame does not overlap the marginal edge of the glass pane 1. The embedding of the glass pane into the highly elastic intervening frame offers the further preference, that the pane will also not easily be demolished by objects striking from the front or from the outside against it.

The invention is not limited to the embodiments illustrated in the drawing. The elastic intervening frame must not necessarily consist of four parts but may also consist of a smaller number of parts. Further the intervening frame must not necessarily consist of rubber but may also consist of any other resilient material. It is essential that the mounting of the glass pane will be deformed under a certain not too high pressure exerted towards the front or towards the outside, so that the glass pane may be squeezed out of the mounting without exerting a very high pressure. This purpose could also be attained by other elastic means which are not of the shape of an intervening frame.

What I claim is:

1. In combination, an outer frame; an inner frame mounted in the outer frame, and inner grooves forming interior and exterior yieldable ledges; and a pane of glass snugly received in said grooves; a number of the interior ledges being sufficiently strong to prevent the inward freeing of the glass pane as a whole; means for positively backing the interior ledges; the exterior yieldable ledges being sufficiently yielding in proportion to the strength of the glass, to free the pane of glass as a whole outwardly before breakage thereof.

2. In combination, a rigid frame; a frame provided with inner grooves forming interior and exterior yieldable ledges; and a pane of glass snugly received in said grooves; the rigid frame carrying rigid means on the interior ledges to form means for positively backing the interior ledges; the exterior yieldable ledges being sufficiently yielding in proportion to the strength of the glass, to free the pane of glass as a whole outwardly before breakage thereof.

3. A device of the character described for motor car wind shields and other purposes; said device comprising a rectangular metal frame having channel shaped members each formed with an inner groove forming front and rear ledges; an inner frame of yielding material mounted in said grooves; the inner edges of the inner frame members being provided with grooves forming front and rear yieldable ledges; and a pane of glass snugly received in said last named grooves; certain of the rear ledges of the metal frame being engaged by the rear yieldable ledges to positively prevent the inward freeing of the glass pane as a whole; the front yieldable ledges being sufficiently yielding in proportion to the strength of the glass, to free the glass pane as a whole before breakage thereof when sufficient force or inertia tends to force the glass outwardly.

4. A device of the character described for motor car wind shields and other purposes; said device comprising a rectangular metal frame comprising channel shaped members each formed with an inner groove, of rectangular cross-section, forming front and rear ledges; a soft rubber inner frame filling said groove and disposed against the inner face of the front ledge and covering all of the forward face of the rear ledge and the rear face of the front ledge; the inner edges of the inner frame members being provided with grooves of rectangular cross section to form front and rear yieldable ledges; and a pane of glass snugly received in said last named grooves; all of the rear yieldable ledges being sufficiently extended to prevent the inward freeing of the glass pane; the front ledges being short enough, and yielding enough, in proportion to the strength of the glass, to free the glass before breakage thereof when sufficient force or inertia tends to force the glass outwardly.

5. A device of the character described for motor car wind shields and other purposes; said device comprising a rectangular metal frame comprising channel shaped members each formed with an inner groove forming front and rear ledges; a soft rubber inner frame filling said groove and disposed against the inner face of the front ledge and covering all of the forward face of the rear ledge and the rear face of the front ledge; the inner edges of the inner frame members being provided with grooves of rectangular cross section to form front and rear yieldable ledges, the rear yieldable ledges being more extended than the front yieldable ledges; a pane of glass snugly received in said last named grooves; all of the yieldable rear ledges being sufficiently strong and extended to prevent the inward freeing of the glass pane as a whole; the front yieldable ledges being short enough, and yielding enough, in proportion to the strength of the glass, to free the glass pane as a whole before breakage thereof when sufficient force or inertia tends to force the glass outwardly.

CURT von VARENDORFF.